US010747761B2

(12) United States Patent
Zhong et al.

(10) Patent No.: US 10,747,761 B2
(45) Date of Patent: Aug. 18, 2020

(54) NEURAL NETWORK BASED TRANSLATION OF NATURAL LANGUAGE QUERIES TO DATABASE QUERIES

(71) Applicant: salesforce.com, inc., San Francisco, CA (US)

(72) Inventors: Victor Zhong, San Francisco, CA (US); Caiming Xiong, Palo Alto, CA (US); Richard Socher, Menlo Park, CA (US)

(73) Assignee: salesforce.com, inc., San Francisco, CA (US)

( * ) Notice: Subject to any disclaimer, the term of this patent is extended or adjusted under 35 U.S.C. 154(b) by 368 days.

(21) Appl. No.: 15/885,613

(22) Filed: Jan. 31, 2018

(65) Prior Publication Data

US 2018/0336198 A1    Nov. 22, 2018

Related U.S. Application Data

(60) Provisional application No. 62/508,367, filed on May 18, 2017.

(51) Int. Cl.
*G06F 16/2452* (2019.01)
*G06N 3/08* (2006.01)
(Continued)

(52) U.S. Cl.
CPC ....... *G06F 16/24522* (2019.01); *G06N 3/006* (2013.01); *G06N 3/0454* (2013.01);
(Continued)

(58) Field of Classification Search
CPC ............... G06F 16/24522; G06F 16/13; G06F 16/24578; G06N 3/0454; G06N 3/006; G06N 3/08; G06N 7/005
See application file for complete search history.

(56) References Cited

U.S. PATENT DOCUMENTS 8,156,145 B2    4/2012  Bozkaya et al.
8,380,645 B2    2/2013  Kowalski
(Continued)

OTHER PUBLICATIONS

El-Mouadib et al., "Generic Interactive Natural Language Interface to Databases (GINLIDB)", International Journal of Computers, Issue 2, vol. 3, 2009. (Year: 2009).*
(Continued)

*Primary Examiner* — David T. Brooks
(74) *Attorney, Agent, or Firm* — Fenwick & West LLP

(57) ABSTRACT

A computing system uses neural networks to translate natural language queries to database queries. The computing system uses a plurality of machine learning based models, each machine learning model for generating a portion of the database query. The machine learning models use an input representation generated based on terms of the input natural language query, a set of columns of the database schema, and the vocabulary of a database query language, for example, structured query language SQL. The plurality of machine learning based models may include an aggregation classifier model for determining an aggregation operator in the database query, a result column predictor model for determining the result columns of the database query, and a condition clause predictor model for determining the condition clause of the database query. The condition clause predictor is based on reinforcement learning.

19 Claims, 8 Drawing Sheets

(51) Int. Cl.
*G06N 7/00* (2006.01)
*G06N 3/04* (2006.01)
*G06N 3/00* (2006.01)
*G06F 16/13* (2019.01)
*G06F 16/2457* (2019.01)

(52) U.S. Cl.
CPC .............. *G06N 3/08* (2013.01); *G06N 7/005* (2013.01); *G06F 16/13* (2019.01); *G06F 16/24578* (2019.01)

(56) References Cited

U.S. PATENT DOCUMENTS

| | | | |
|---|---|---|---|
| 9,830,315 B1* | 11/2017 | Xiao | G06F 40/30 |
| 2007/0027905 A1* | 2/2007 | Warren | G06F 8/51 |
| 2011/0314010 A1 | 12/2011 | Ganti et al. | |
| 2016/0140123 A1* | 5/2016 | Chang | G06F 16/24522 707/760 |
| 2016/0171050 A1 | 6/2016 | Das | |
| 2016/0342597 A1* | 11/2016 | Azzam | G06F 16/24522 |
| 2017/0061330 A1* | 3/2017 | Kurata | G06F 16/355 |
| 2017/0109355 A1 | 4/2017 | Li et al. | |
| 2017/0161262 A1* | 6/2017 | Bhatt | G06F 16/24522 |
| 2018/0052824 A1* | 2/2018 | Ferrydiansyah | G06F 40/30 |
| 2018/0143978 A1* | 5/2018 | Chang | B60N 2/2806 |

OTHER PUBLICATIONS

Dong et al., "Language to Logical Form with Neural Attention" ArXiv abs/1601.01280, 2016 (Year: 2016).*
Yin et al. "Neural Enquirer: Learning to Query Tables." ArXiv abs/1512.00965, 2015 (Year: 2015).*
Mahmud et al., "A Rule Based Approach for NLP Based Query Processing", Proceedings of International Conference on Electrical Information and Communication Technology, 2015 (Year: 2015).*
Bais et al., "Querying Database using a universal Natural Language Interface Based on Machine Learning", 2016 International Conference on Information Technology for Organizations Development (IT4OD), Fez, 2016, pp. 1-6. (Year: 2016).*
Prakash et al., "SQL Translator Using Artificial Neural Networks", 1996 Australian New Zealand Conference on Intelligent Information Systems. Proceedings. ANZIIS 96, Adelaide, SA, Australia, 1996, pp. 73-75. (Year: 1996).*
Li, Y., "Deep Reinforcement Learning: An Overview," arXiv:1701.07274, arXiv.org, 2017, pp. 1-30.
Luong, M-T. et al., "Effective Approaches to Attention-Based Neural Machine Translation," Proceedings of the 2015 Conference on Empirical Methods in Natural Language Processing, Association for Computational Linguistics, Sep. 17-21, 2015, pp. 1412-1421.
Wang, F. et al., "Survey on the Attention Based RNN Model and Its Applications in Computer Vision," arXiv:1601.06823, arXiv.org, 2016, 42 pages.
Merity, S. et al., "Pointer Sentinel Mixture Models," arXiv:1609.07843, arXiv.org, 2016, 13 pages.
Vinyals, O. et al., "Pointer Networks," Advances in Neural Information Processing Systems 28 (NIPS 2015), 2015, 9 pages.
CS 224D: Deep Learning for NLP, Lecture Notes Part I, Spring 2015, Course Instructor: R. Socher, Authors: F. Chaubard et al., stanford.edu, 2015, pp. 1-11.
CS 224D: Deep Learning for NLP, Lecture Notes Part II, Spring 2015, Course Instructor: R. Socher, Authors: R. Mundra et al., stanford.edu, 2015, pp. 1-11.
CS 224D: Deep Learning for NLP, Lecture Notes Part III, Spring 2015, Course Instructor: R. Socher, Authors: R. Mundra et al., stanford.edu, 2015, pp. 1-14.
CS 224D: Deep Learning for NLP, Lecture Notes Part IV, Spring 2015, Course Instructor: R. Socher, Authors: M. Mohammadi et al., stanford.edu, 2015, pp. 1-11.
CS 224D: Deep Learning for NLP, Lecture Notes Part V, Spring 2015, Course Instructor: R. Socher, Authors: F. Chaubard et al., stanford.edu, 2015, pp. 1-6.
PCT International Search Report and Written Opinion, PCT Application No. PCT/US2018/033099, dated Dec. 7, 2018, 12 pages.

* cited by examiner

NEURAL NETWORK BASED TRANSLATION OF NATURAL LANGUAGE QUERIES TO DATABASE QUERIES

CROSS-REFERENCE TO RELATED APPLICATIONS

This application claims the benefit of U.S. Provisional Application No. 62/508,367, filed May 18, 2017, which is incorporated by reference herein.

BACKGROUND

Field of Art

The disclosure relates in general to automatic generation of database queries, and more specifically to neural network based models for translating natural language queries to database queries.

Description of the Related Art

A significant amount of data available in the world is stored in relational databases. Relational databases provide the foundation of applications such as medical records, financial markets, customer relations management, and so on. However, accessing information in relational databases requires an understanding of database query languages such as the structured query language (SQL). Although database query languages such as SQL are powerful in terms of allowing a user to specify requests for data from a relational database, they are difficult to learn. To be able to write database queries effectively using database query languages requires expertise in databases and strong technical knowledge.

Some systems support natural language for accessing data stored in the system. Natural language queries provide ease of expression since people do not require training to use natural language. However, these systems do not provide the expressive power of the database query languages such as SQL. For example, a natural language query may be interpreted in multiple ways and the corresponding execution of the natural language query to access data stored in a relational database may be inefficient and may not retrieve the exact information that was requested. Accordingly, conventional techniques for accessing data stored in relational databases using either natural language queries or database queries have drawbacks since they either provide ease of expression or the power of expression, but not both.

BRIEF DESCRIPTION OF DRAWINGS

The disclosed embodiments have other advantages and features which will be more readily apparent from the detailed description, the appended claims, and the accompanying figures (or drawings). A brief introduction of the figures is below.

Figure 1:
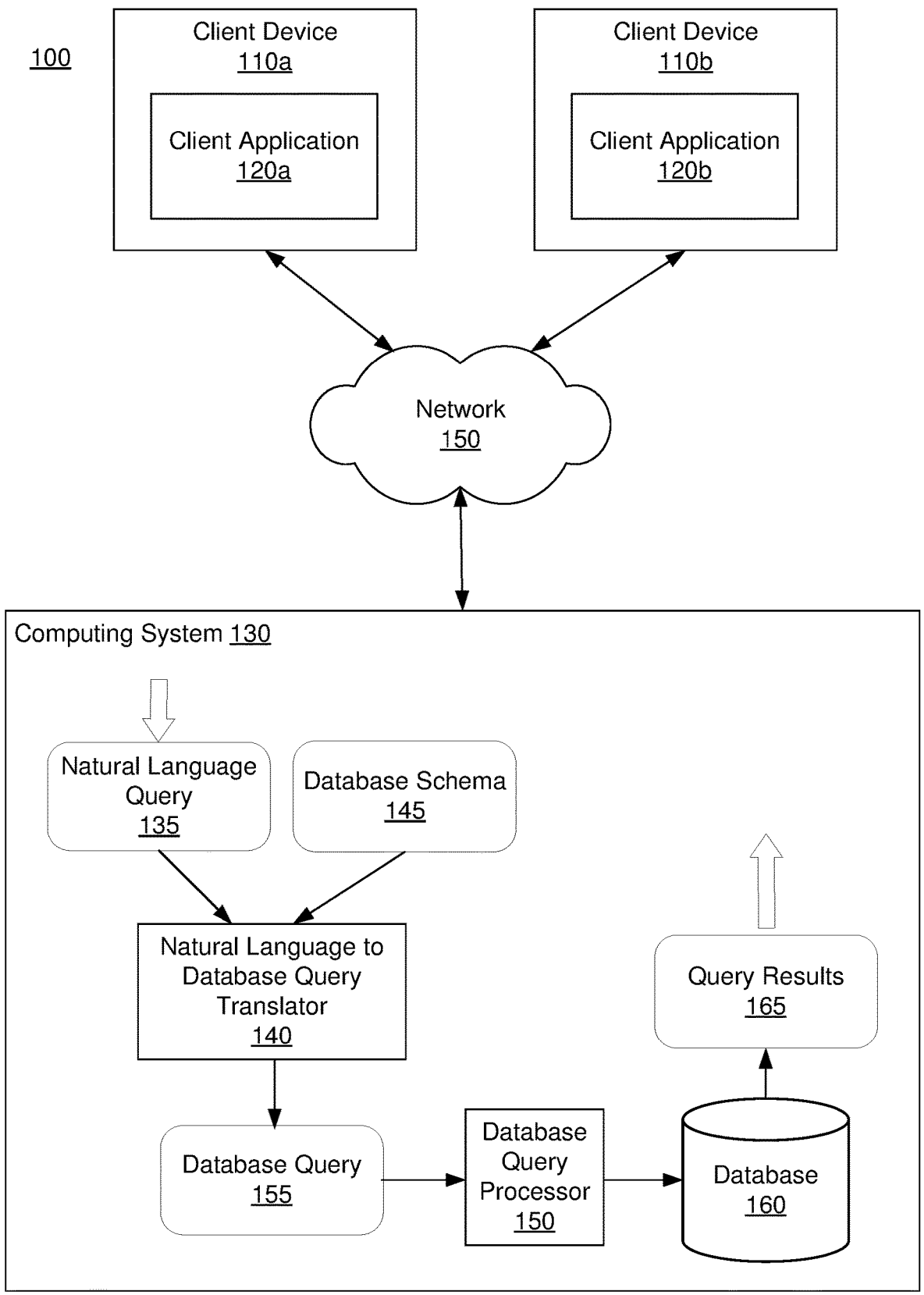
FIG. 1 is a high-level block diagram illustrating the overall system environment for translating natural language queries to database queries, in accordance with an embodiment.

The Figures (FIGS.) and the following description describe certain embodiments by way of illustration only. One skilled in the art will readily recognize from the following description that alternative embodiments of the structures and methods illustrated herein may be employed without departing from the principles described herein. Reference will now be made in detail to several embodiments, examples of which are illustrated in the accompanying figures.

DETAILED DESCRIPTION

A computing system uses deep neural networks for translating natural language queries to corresponding database queries, for example, queries specified using structured query language (SQL). Embodiments use the structure of SQL queries to greatly reduce the output space of generated queries. The computing system uses deep neural networks to translate the natural language query to a database query.

In an embodiment, the computing system uses a plurality of machine learning based models, for example, neural network based models to generate different portions of the output database query. For example, the computing system may use an aggregation classifier model for determining an aggregation operator in the database query, a result column predictor model for determining the result columns of the database query, and a condition clause predictor model for determining the condition clause of the database query. In an embodiment, the aggregation classifier model and result column predictor model comprise multi-layer perceptrons. The condition clause predictor model uses policy-based reinforcement learning (RL) to generate the condition clause of the database query. This is so because the condition clause is unordered in nature and multiple representations of the condition clause may provide the same output result for the database query. Therefore the condition clause unsuitable for optimization using cross entropy loss. The deep neural network is trained using a mixed objective that combines cross entropy losses and RL rewards.

As an example, a database may store a table CFLDraft with columns Pick_number, CFL_Team, Player, Position, and College. The table may store following example rows.

| Pick_number | CFL_Team | Player | Position | College |
|---|---|---|---|---|
| 27 | Hamilton Tiger-Cats | Connor Healy | DB | Wilfrid Laurier |
| 28 | Calgary Stampeders | Anthony Forgone | OL | York |

| Pick_number | CFL_Team | Player | Position | College |
|---|---|---|---|---|
| 29 | Ottawa Renegades | L. P. Ladouceur | DT | California |
| 30 | Toronto Argonauts | Frank Hoffman | DL | York |
| ... | ... | ... | ... | ... |

The system receives a natural language query, for example, "How many CFL teams are from York College?" The system processes the received natural language query in connection with the database schema comprising the table CFLDraft to generate a database query using SQL language "SELECT COUNT(CFL_Team) FROM CFLDraft WHERE College="York"". The system executes the database query using the database schema. Two rows of the table CLFDraft match the WHERE clause of the database query since they have the college "York". As a result the system returns the result 2.

Overall System Environment

FIG. 1 is a high-level block diagram illustrating the overall system environment for translating natural language queries to database queries, in accordance with an embodiment. The system environment 100 includes one or more client devices 110 connected by a network 150 to a computing system 130. The computing system 130 may be an online system but may also work offline, for example, by performing batch processing for translating each of a set of natural language queries to database queries.

Here only two client devices 110a, 110b are illustrated but there may be multiple instances of each of these entities. For example, there may be several computing systems 130 and dozens or hundreds of client devices 110 in communication with each computing system 130. The figures use like reference numerals to identify like elements. A letter after a reference numeral, such as "110a," indicates that the text refers specifically to the element having that particular reference numeral. A reference numeral in the text without a following letter, such as "110," refers to any or all of the elements in the figures bearing that reference numeral.

The client devices 110 are computing devices such as smartphones with an operating system such as ANDROID® or APPLE® IOS®, tablet computers, laptop computers, desktop computers, electronic stereos in automobiles or other vehicles, or any other type of network-enabled device on which digital content may be listened to or otherwise experienced. Typical client devices 110 include the hardware and software needed to connect to the network 150 (e.g., via Wifi and/or 4G or other wireless telecommunication standards).

The client device 110 includes a client application 120 that allows a user of the client device 110 to interact with the computing system 130. For example, the client application 120 may be a user interface that allows users to input natural language queries that are sent to the computing system 130. The client application 120 receives results from the computing system 130 and presents them to the user via the user interface. In an embodiment, the client application 120 is a browser that allows users of client devices 110 to interact with a web server executing on the computing system 130.

The computing system 130 includes software for performing a group of coordinated functions or tasks. The software may allow users of the computing system 130 to perform certain tasks or activities of interest, or may include system software (e.g., operating systems) that provide certain functionalities and services to other software. The computing system 130 receives requests from client devices 110 and executes computer programs associated with the received requests. As an example, the computing system 130 may execute computer programs responsive to a request from a client device 110 to translate natural language queries to database queries. Software executing on the computing system 130 can include a complex collection of computer programs, libraries, and related data that are written in a collaborative manner, in which multiple parties or teams are responsible for managing different components of the software.

In an embodiment, the computing system 130 receives a natural language query 135 from a client device 110. The natural language query 130 may be provided by a user via the client application 120 executing on the computing system 130. The computing system 130 stores a database schema 145 that defines the structure of data stored in a database. For example, the database schema 145 may identify various tables stored in the database, the columns of each table, the relations between tables such as foreign key relations, any constraints associated with the tables, and so on.

The natural language to database query translator 140 receives the natural language query 135 and the database schema 145 as input and generates a database query 155 that is equivalent to the input natural language query 135. The generated database query 155 conforms to the database schema 145. The generated database query 155 is received by a database query processor 150 that processes the database query 155 using the data stored in the database 160. The database query processor 150 generates the query results 165 by processing the database query 155. The computing system 130 provides the generated query results 165 to the client application 120 running on the client device 110 that sent the natural language query 135.

In an embodiment, the natural language to database query translator 140 performs a sequence to sequence translation. Conventional neural network based sequence to sequence translator search in a very large space. In contrast, embodiments exploit the structure inherent in a database query language to reduce the search space. In particular, the system limits the output space of the generated sequence based on the union of the table schema, the input question, and SQL key words. In one embodiment, the natural language to database query translator 140 uses a deep neural network that is a pointer network with augmented inputs.

The network 150 provides a communication infrastructure between the client devices 110 and the record management system 130. The network 150 is typically the Internet, but may be any network, including but not limited to a Local Area Network (LAN), a Metropolitan Area Network (MAN), a Wide Area Network (WAN), a mobile wired or wireless network, a private network, or a virtual private network. Portions of the network 150 may be provided by links using communications technologies including WiFi based on the IEEE 802.11 standard, the BLUETOOTH short range standard, and the Wireless Universal Serial Bus (USB) standard.

System Architecture

Figure 2:
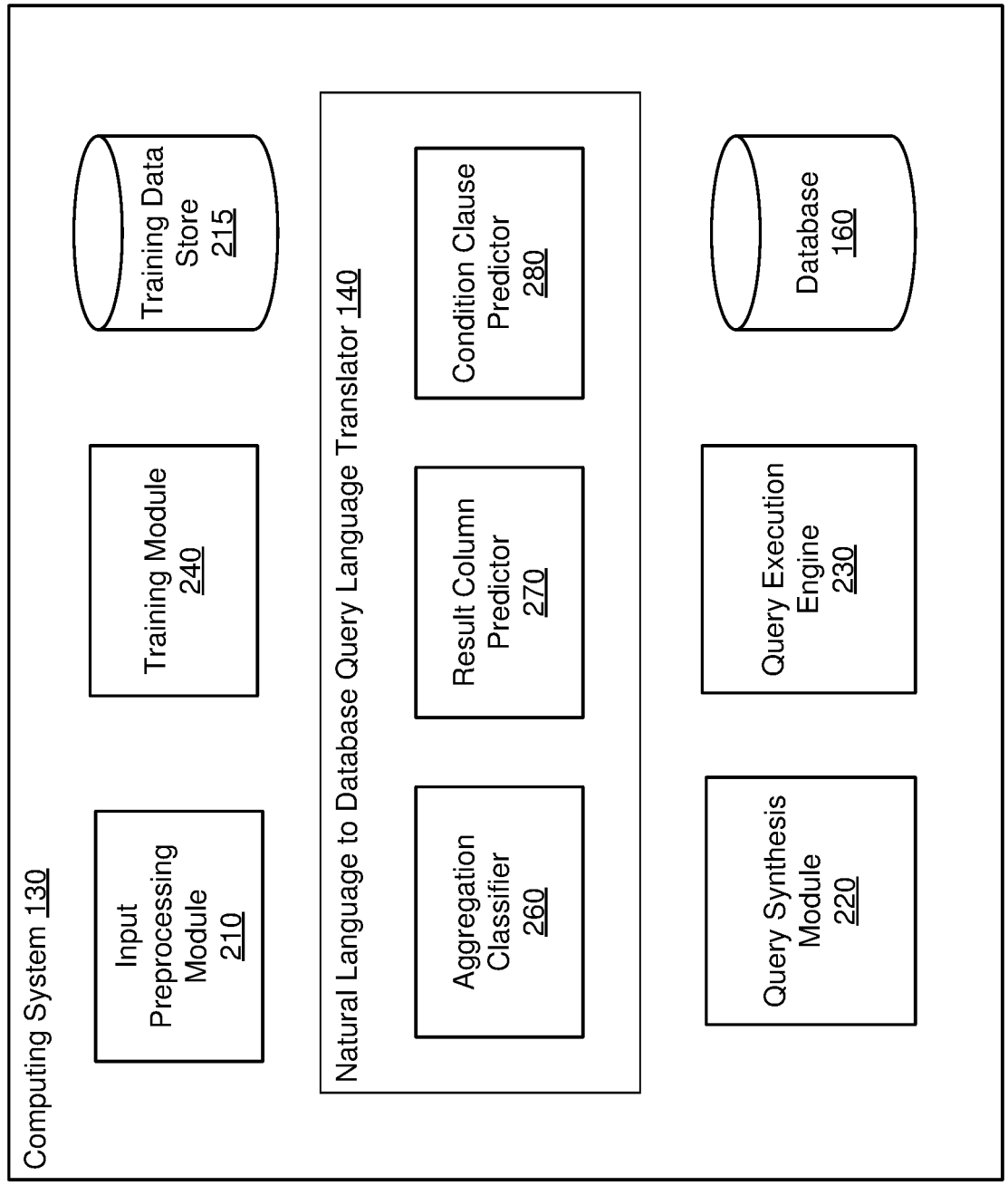
FIG. 2 illustrates the system architecture of the computing system for translating natural language queries to database queries, in accordance with an embodiment.

FIG. 2 illustrates the system architecture of the computing system for translating natural language queries to database queries, in accordance with an embodiment. The computing system 130 comprises an input encoding module 210, a training module 240, a natural language to database query translator 140, a query synthesis module 220, a query execution engine 230, a training data store 215, and a database 160. Conventional components such as network interfaces, security functions, load balancers, failover servers, management and network operation consoles, and the like are not shown so as to not obscure the details of the system architecture.

The input preprocessing module 210 preprocesses the input data for providing as input to the natural language to database query translator 140. In an embodiment, the input preprocessing module 210 generates 420 a sequence of tokens by concatenating column names from the database schema, the input natural language query, and the vocabulary of the database query language, for example, SQL. The input preprocessing module 210 generates one or more input representations for providing to the various models that generate the various parts of the output database query.

The natural language to database query translator 140 processes an input natural language query for generating the database query corresponding to the natural language query. In an embodiment, the natural language to database query translator 140 includes other components, for example, an aggregation classifier 260, a result column predictor 270, and a condition clause predictor 280, further described herein, in connection with FIG. 3.

The natural language to database query translator 140 generates different components of the database query using different neural networks. In an embodiment, the natural language to database query translator 140 uses a different neural network to generate the components of a database query including the select columns, an aggregation operator, and a where clause.

The training module 240 uses historical data stored in training data store 215 to train the neural networks in the natural language to database query translator 140. In an embodiment, the training module 240 trains the aggregation classifier 260 and the result column predictor 270 using cross entropy loss, but trains the condition clause predictor 280 using policy gradient reinforcement learning in order to address the unordered nature of query conditions. Utilizing the structure of a SQL query allows the natural language to database query translator 140 to reduce the output space of database queries. This leads to a significantly higher performance compared to other techniques that do not exploit the query structure.

The query synthesis module 220 receives various components of the database query as generated by the natural language to database query translator 140 and combines them to obtain a database query. The query execution module 230 executes the database query provided by the query synthesis module 220 using the data stored in the database 160. The computing system 130 returns the result of execution of the query to the requestor of the result, for example, a client application 120 executing on a client device 110.

Figure 3:
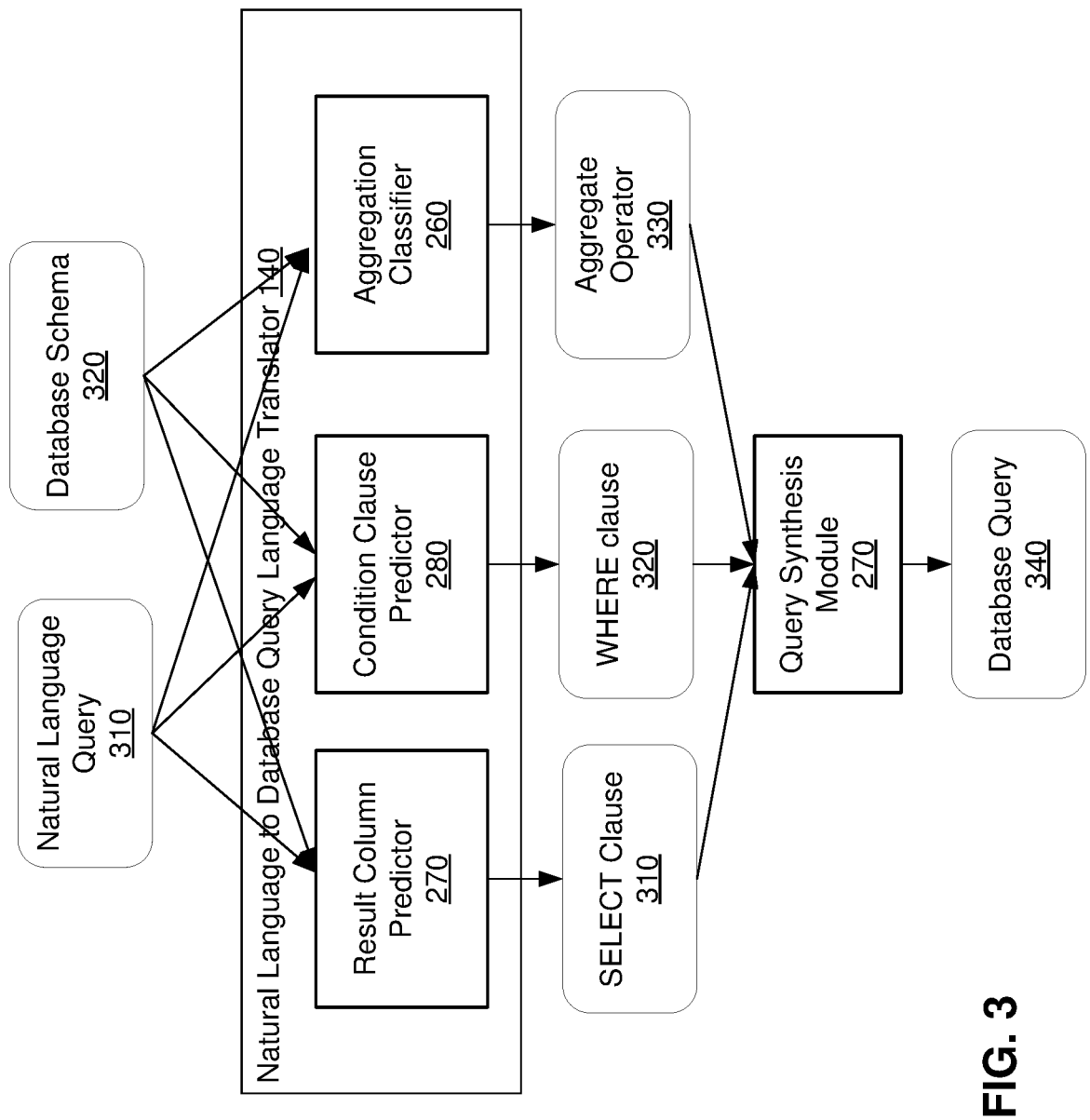
FIG. 3 illustrates the details of the processing performed by the natural language to database query translator, according to an embodiment.

FIG. 3 illustrates the details of the processing performed by the natural language to database query translator 140, according to an embodiment. As shown in FIG. 3. The inputs to the natural language to database query translator 140 include the natural language query 320 and the database schema 320. In the example illustrated above based on CFLDraft table, the natural language query 320 is "How many CFL teams are from York College?" and the database schema 320 comprises the various columns including columns Pick_number, CFL_Team, Player, Position, and College. The example output database query is "SELECT COUNT(CFL_Team) FROM CFLDraft WHERE College="York"".

The input preprocessing module 210 generates one or more input representations and provides an input representation to each component of the natural language to database query translator 140 including the aggregation classifier 260, the result column predictor 270, and the condition clause predictor 280. Each of the aggregation classifier 260, the result column predictor 270, and the condition clause predictor 280 generates a part of the output database query.

The result column predictor 270 generates the result columns, for example, the columns specified in the SELECT clause 310 of the output database query expressed using SQL. An example of a result column is the column CFL_Team in the example output database query. In an embodiment, the result column predictor 270 is a pointer network that receives an encoding of a sequence of columns as input and points to a column in the sequence of columns corresponding to a SELECT column.

The condition clause predictor 280 generates the WHERE clause 320 of the output database query that specifies the condition used to filter the output rows of the output database query. In the above example, the WHERE clause "College="York"" is the condition clause in the output database query.

The aggregation classifier 260 generates an aggregation operator 330 in the output database query if any, for example, the COUNT operator in the example output database query. The aggregation operators produce a summary of the rows selected by the SQL. Examples of aggregation operators that may be generated by the aggregation classifier 260 include maximum (MAX), minimum (MIN), average (AVG), sum (SUM), and so on. The aggregation classifier 260 may generate a NULL aggregation operator if there is no aggregation operator in the output query.

The various components of the output database query including the SELECT clause 310, the WHERE clause 320, and the aggregation operator 330 are provided as input to the query synthesis module 270. The query synthesis module 270 combines the individual components of the output database query to generates the complete output database query 340.

Overall Process

FIGS. 4-7 illustrate various process for translating natural language queries to database queries. Those of skill in the art will recognize that other embodiments can perform the steps of FIGS. 4-7 in different orders than those shown in the flowcharts. Moreover, other embodiments can include different and/or additional steps than the ones described herein. Steps indicated as being performed by certain modules may be performed by other modules.

Figure 4:
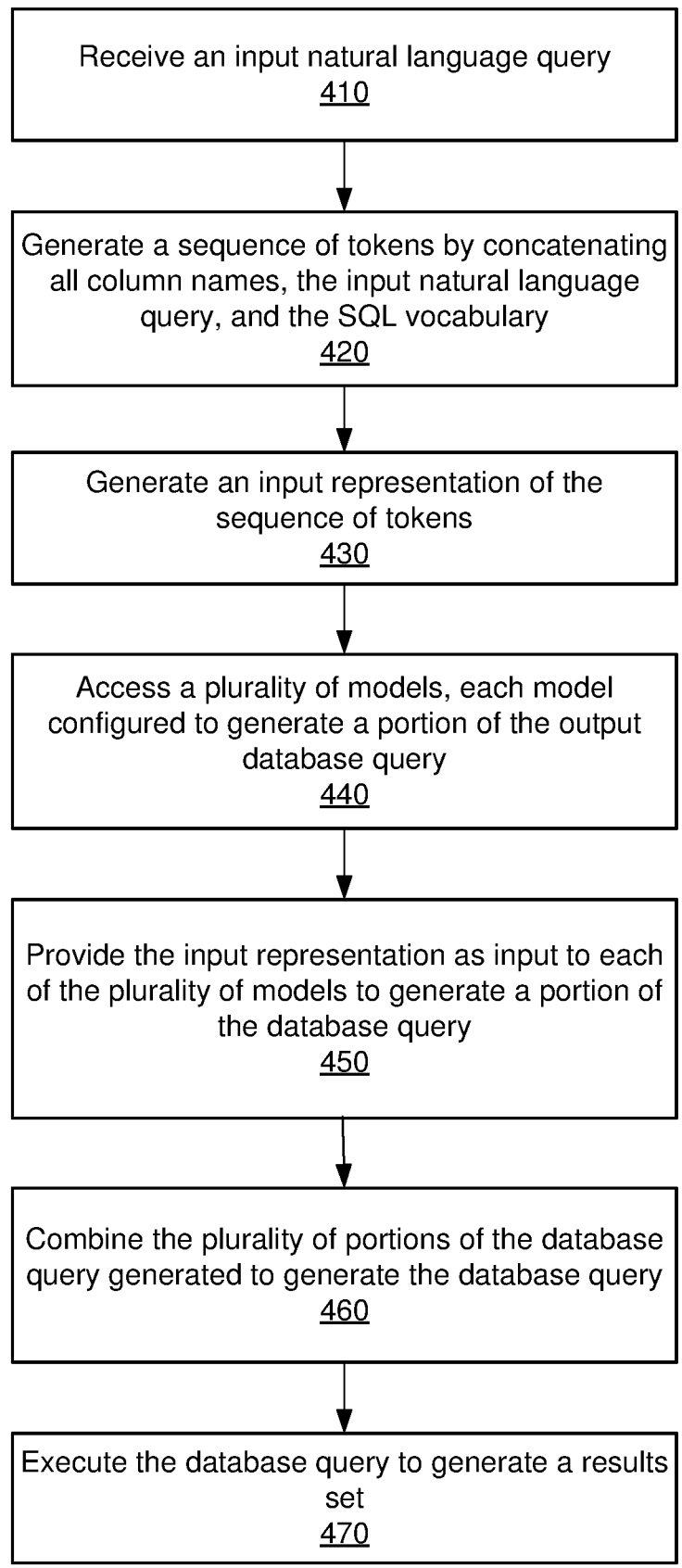
FIG. 4 illustrates the overall process for translating natural language queries to database queries, according to an embodiment

FIG. 4 illustrates the overall process for translating natural language queries to database queries, according to an embodiment. The natural language to database query translator 140 receives 410 an input natural language query. The input preprocessing module 210 generates 420 a sequence of tokens by concatenating column names from the database schema, the input natural language query, and the vocabulary of the database query language, for example, various keywords of the SQL language such as SELECT, FROM, WHERE, and so on.

For example, equation (1) shows the sequence of tokens comprising the columns names $x_i^c$, the terms $x^s$ representing the SQL vocabulary, and the terms $x^q$ representing the input natural language query.

$$x=[<col>;x_1^c;x_2^c; \ldots ;x_N^c;<sql>;x^s;<question>;x^q] \quad (1)$$

In equation (1), concatenation between the sequences a and b is represented as [a; b]. Furthermore, the combined sequence x includes sentinel tokens between neighboring sequences to demarcate the boundaries. For example, token <col> identifies columns names, token <sql> identifies terms representing SQL vocabulary, and token <question> identifies terms of the input natural language query.

The input preprocessing module 210 generates 430 an input representation of the sequence of tokens. In an embodiment, the input preprocessing module 210 generates multiple input representations, one for each of the plurality of models.

The natural language to database query translator 140 accesses a plurality of neural machine learning models, each model configured to generate a portion of the output database query. In an embodiment, the natural language to database query translator 140 loads the plurality of trained neural network based models from a storage device to memory. The natural language to database query translator 140 provides 450 an input representation to each of the plurality of machine learning based models. Each of the plurality of machine learning based models generates a portion of the database query.

In some embodiments, the input preprocessing module 210 generates multiple input representations, the natural language to database query translator 140 may provide a different input representation to each machine learning based model. Each machine learning based model generates a portion of the database query and provides it to the query synthesis module 270. The query synthesis module 270 combines 460 the plurality of portions of the database query to generate the full database query. The query execution engine 230 executes 470 the database query to generate a results set.

Aggregation Classifier

Figure 5:
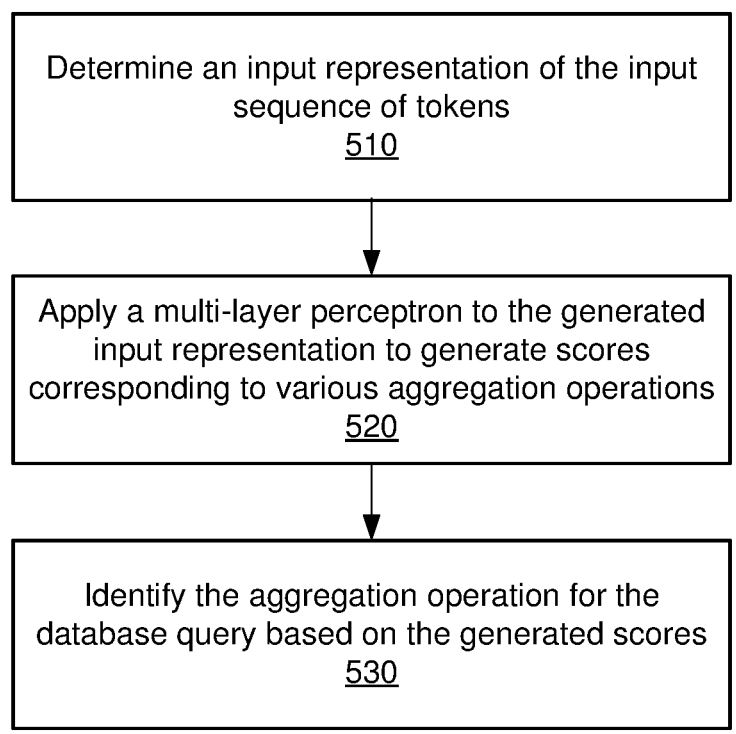
FIG. 5 illustrates the process of the aggregation classifier for determining the aggregation operator of the output database query based on a natural language query, according to an embodiment.

FIG. 5 illustrates the process of the aggregation classifier for determining the aggregation operator of the output database query based on a natural language query, according to an embodiment. The aggregation classifier 260 determines the aggregation operator of the output database query based on the type of question specified in the input natural language query. For example, the aggregation classifier 260 may map an input question comprising the string "how many" to the aggregation operator COUNT, the aggregation classifier 260 may map an input question comprising "what is the highest" to the aggregation operator maximum, the aggregation classifier 260 may map an input question comprising "what is the smallest" to the aggregation operator minimum, and so on.

The aggregation classifier 260 determines 510 an input representation of the input sequence of tokens. The aggregation classifier 260 computes a scalar attention score $\alpha_t^{inp} = W^{inp} * h_t^{enc}$ for each $t^{th}$ token in the input sequence. Accordingly, the aggregation classifier 260 generates a vector of scores $\alpha^{inp} = [\alpha_1^{inp}, \alpha_2^{inp}, \ldots]$. The aggregation classifier 260 normalizes the vector of scores $\alpha^{inp}$, to produce a distribution over the input encodings by applying the softmax function to the $\alpha^{inp}$ vector to determine $\beta^{inp} = \text{softmax}(\alpha^{inp})$. The aggregation classifier 260 produces a distribution over the input encodings. The aggregation classifier 260 determines 510 the input representation $\kappa^{agg}$ as the sum over the input encodings $h^{enc}$ weighted by the normalized scores $\beta^{inp}$ as shown by the following equation.

$$\kappa^{agg} = \sum_t \beta_t^{inp} h_t^{enc} \qquad (2)$$

The aggregation classifier 260 comprises a multi-layer perceptron applied to the generated input representation $\kappa^{agg}$ to generate scores $\alpha^{agg}$ corresponding to various aggregation operations, for example, COUNT, MIN, MAX, the NULL operator indicating no aggregation, and so on. The aggregation classifier 260 identifies 530 the aggregation operation for the database query based on the generated scores.

In an embodiment, the aggregation classifier 260 determines $\alpha^{agg}$ using the following equation.

$$\alpha^{agg} = W^{agg} \tan h(V^{agg} \kappa^{agg} + b^{agg}) + c^{agg} \qquad (3)$$

The terms $W^{agg}$, $V^{agg}$, $b^{agg}$, and $c^{agg}$ denote weights corresponding to the multi-layer perceptron. The aggregation classifier 260 applies the softmax function to obtain the distribution over the set of possible aggregation operations $\beta^{agg} = \text{softmax}(\alpha^{agg})$. The aggregation classifier is trained based on the cross entropy loss $L^{agg}$.

Result Column Predictor

The SELECT clause is also referred to as the selection columns or the result columns. The result column predictor 270 determines the selection columns based on the table columns in the database schema as well as the natural language query. For example, given a natural language query "How many CFL teams . . . " the result column predictor 270 determines that the selection columns include CFL_Teams column from the CFLDraft table. Accordingly, the result column predictor 270 solves the problem of SELECT column prediction as a matching problem. In an embodiment, the result column predictor 270 uses a pointer to identify a SELECT column. Given the list of column representations and a representation of the natural language query, the result column predictor 270 selects the column that best matches the natural language query.

Figure 6:
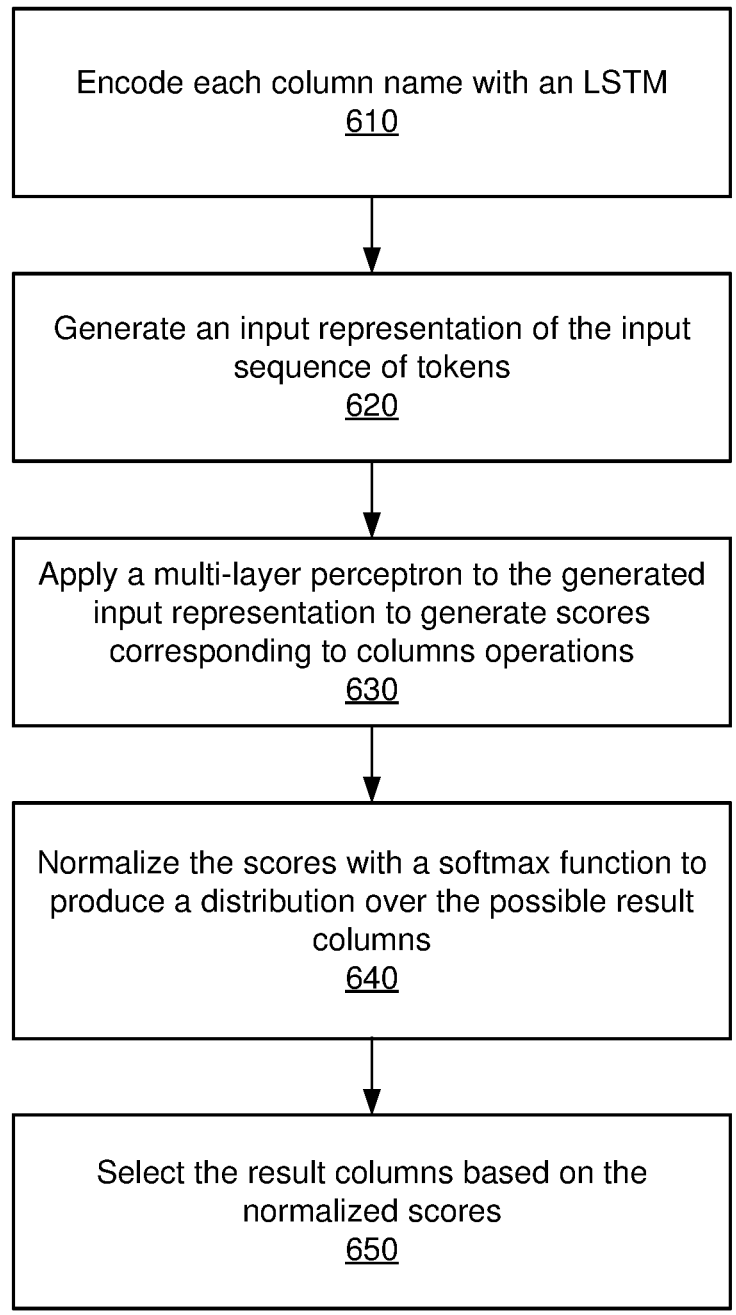
FIG. 6 illustrates the process of the result column predictor for determining the columns of the SELECT clause of the output database query based on a natural language query, according to an embodiment.

FIG. 6 illustrates the process performed by the result column predictor for determining the columns of the SELECT clause of the output database query based on a natural language query, according to an embodiment. The result column predictor 270 uses an input representation for the columns by encoding 610 each column name with an LSTM (long short term memory network). The input preprocessing module 210 generates 620 an input representation of a particular column j, $e_c^j$, using the following equation.

$$h_{j,t}^c = \text{LSTM}(\text{emb}(x_{j,t}^c), h_{j,t-1}^c) e_j^c = h_{j,T_j}^c \qquad (4)$$

In this equation, $h_{j,t}^c$ denotes the $t^{th}$ encoder state of the $j^{th}$ column and emb is a function that returns an embedding. The input preprocessing module 210 takes the last encoder state to be $e_j^c$, column j's representation.

The input preprocessing module 210 constructs a representation for the natural language query $\kappa^{sel}$ using an architecture similar to that described above for $\kappa^{agg}$. The result column predictor 270 applies 630 a multi-layer perceptron over the column representations, conditioned on the input representation, to compute the score for each column j using the following equation.

$$\alpha_j^{sel} = W^{sel} \tan h(V^{sel} \kappa^{sel} + V^c e_j^c) \qquad (5)$$

In this equation $W^{sel}$, $V^{sel}$, and $V^c$ are weights of the multi-layer perceptron. The result column predictor 270 normalizes 640 the scores with a softmax function to produce a distribution over the possible SELECT columns $\beta^{sel} = \text{softmax}(\alpha^{sel})$. In the above example of the CFLDraft table, the distribution is over the columns Pick_number, CFL_Team, Player, Position, and College. The result column predictor 270 selects 650 the result columns of the output database query based on the normalized scores. The aggregation classifier is trained based on the cross entropy loss $L^{sel}$.

Condition Clause Predictor

In an embodiment, the condition clause predictor generates the WHERE clause using a pointer decoder. However, the WHERE conditions of a query can be swapped and the query would yield the same result. For example, given a natural language query "which males are older than 18", the output database query can be either "SELECT name FROM insurance WHERE age>18 AND gender="male"" or "SELECT name FROM insurance WHERE gender="male" AND age>18". Both database queries obtain the correct execution result even though the two database queries do not match based on a string match between the two query strings. If the first database query is provided as the ground truth while training the neural network and cross entropy loss is used to supervise the training, the second database query will be wrongly penalized since it does not match the first database query based on a string match. Therefore embodiments apply reinforcement learning to learn a policy to directly optimize the expected correctness of the execution result of the database query.

Figure 7:
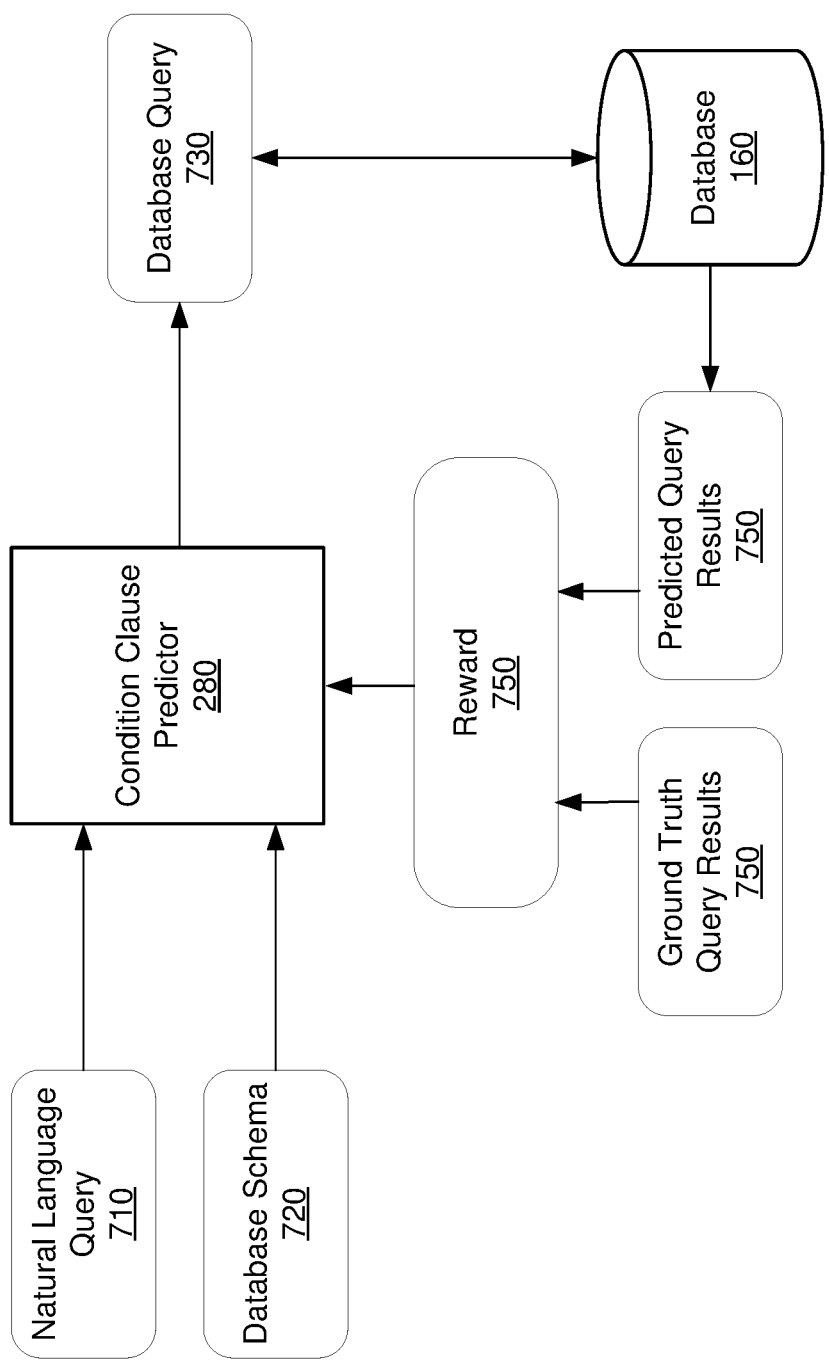
FIG. 7 illustrates the process of training the condition clause predictor for determining the condition clause of the output database query, according to an embodiment.

FIG. 7 illustrates the process of training the condition clause predictor for determining the condition clause of the output database query, according to an embodiment. The condition clause predictor 280 receives as input a natural language query 710 and a database schema 720 to generate the database query 730. The condition clause predictor 280 sends the database query for execution using the database 160 to obtain a reward metric. The query execution engine 230 executes the generated database query 730 to obtain the predicted query results 750. The computing system 130 stores the ground truth query results 750 in training data store 215. The condition clause predictor 280 compares the predicted query results 750 with the ground truth query results 750 to determine the reward 750. The reward is provided as input to the condition clause predictor 280 as feedback for training the condition clause predictor 280.

The sequence of tokens generated by the condition clause predictor 280 in the WHERE clause is denoted by $y=[y^1, y^2, \ldots, y^T]$. Let q(y) denote the query generated by the model and $q_g$ denote the ground truth database query corresponding to the natural language query. The condition clause predictor 280 uses the following equation as the reward metric $R(q(y), q_g)$.

$$R(q(y), q_g) = \begin{cases} -2, & \text{if } q(y) \text{ is not a valid } SQL \text{ query} \\ -1, & \text{if } q(y) \text{ is a valid } SQL \text{ query and executes to an incorrect result} \\ +1, & \text{if } q(y) \text{ is a valid } SQL \text{ query and executes to the correct result} \end{cases} \quad (6)$$

Accordingly, the condition clause predictor 280 assigns a positive reward if the result of execution of the generated database query matches the expected results provided as ground truth. The condition clause predictor 280 assigns a negative reward if the result of execution of the generated database query fails to match the expected results provided as ground truth or if the generated database query is not a valid database query.

The condition clause predictor 280 determines the loss $L^{whe}$ as the negative expected reward over possible WHERE clauses. The training module trains the condition clause predictor 280 using gradient descent to minimize the objective function $L=L^{agg}+L^{sel}+L^{whe}$. Accordingly, the condition clause predictor 280 determines a total gradient as the weighted sum of the gradients from the cross entropy loss in predicting the SELECT column, from the cross entropy loss in predicting the aggregation operation, and from policy learning for the condition clause.

The incorporation of structure in the natural language to database query translator 140 reduces invalid database queries that may be generated. A large quantity of invalid queries result from column names—the generated query refers to selection columns that are not present in the table. This is particularly helpful when the column name contain many tokens, such as "Miles (km)", which has 4 tokens. Introducing a classifier for the aggregation also reduces the error rate. Use of the aggregation classifier improves the precision and recall for predicting the COUNT operator. Use of representation learning for generating condition clause results in generation of higher quality WHERE clause that may be ordered differently than ground truth. Training with policy-based representation learning results in correct results even if the order of conditions is differs from the ground truth query.

Computer Architecture

Figure 8:
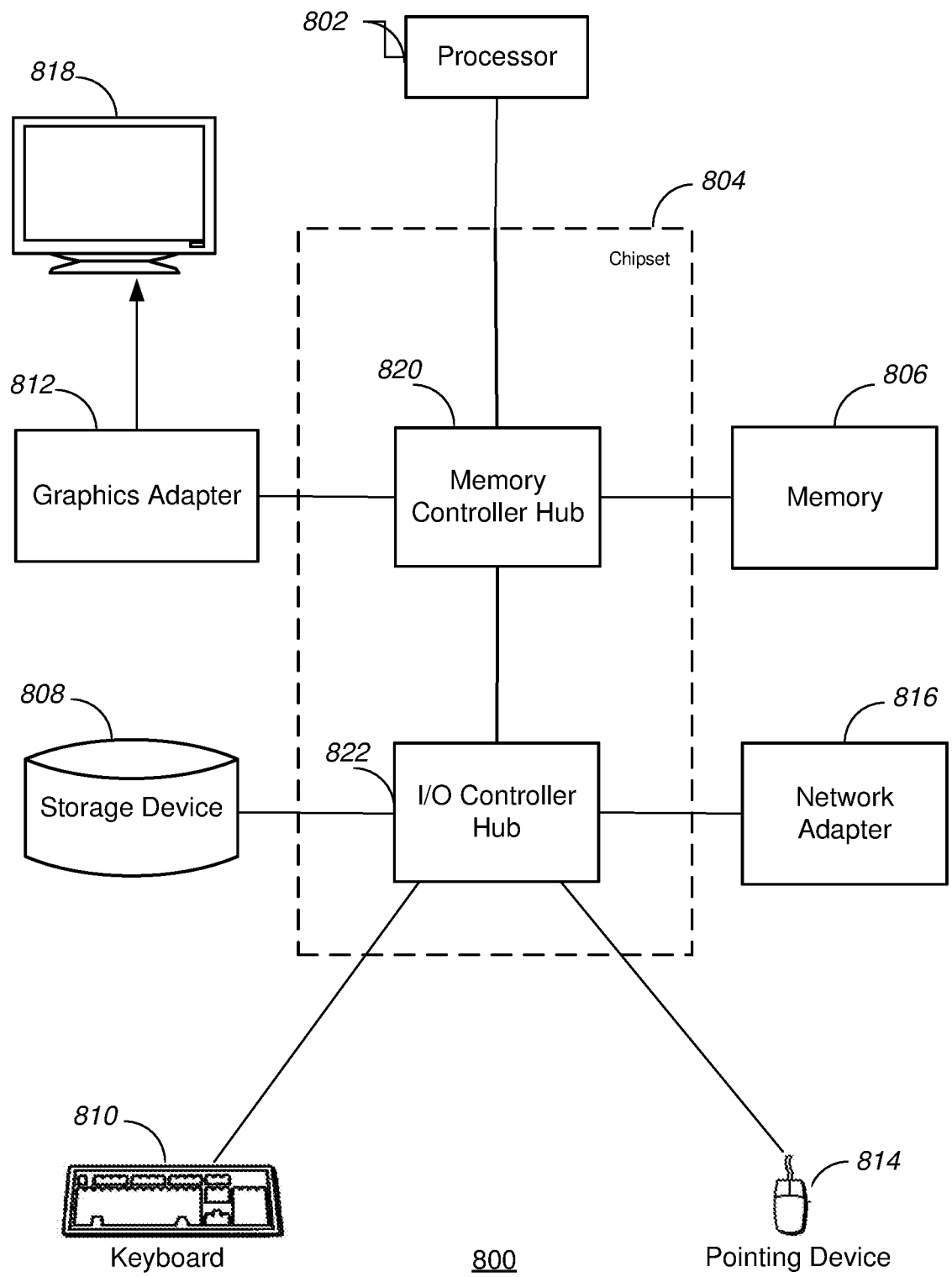
FIG. 8 is a high-level block diagram illustrating an example computer for implementing the client device and/or the computing system of FIG. 1.

FIG. 8 is a high-level block diagram illustrating an example computer for implementing the client device and/or the computing system of FIG. 1. The computer 800 includes at least one processor 802 coupled to a chipset 804. The chipset 804 includes a memory controller hub 820 and an input/output (I/O) controller hub 822. A memory 806 and a graphics adapter 812 are coupled to the memory controller hub 820, and a display 818 is coupled to the graphics adapter 812. A storage device 808, an input device 814, and network adapter 816 are coupled to the I/O controller hub 822. Other embodiments of the computer 800 have different architectures.

The storage device 808 is a non-transitory computer-readable storage medium such as a hard drive, compact disk read-only memory (CD-ROM), DVD, or a solid-state memory device. The memory 806 holds instructions and data used by the processor 802. The input interface 814 is a touch-screen interface, a mouse, track ball, or other type of pointing device, a keyboard, or some combination thereof, and is used to input data into the computer 800. In some embodiments, the computer 800 may be configured to receive input (e.g., commands) from the input interface 814 via gestures from the user. The graphics adapter 812 displays images and other information on the display 818. The network adapter 816 couples the computer 800 to one or more computer networks.

The computer 800 is adapted to execute computer program modules for providing functionality described herein. As used herein, the term "module" refers to computer program logic used to provide the specified functionality. Thus, a module can be implemented in hardware, firmware, and/or software. In one embodiment, program modules are stored on the storage device 808, loaded into the memory 806, and executed by the processor 802.

The types of computers 800 used by the entities of FIG. 1 can vary depending upon the embodiment and the processing power required by the entity. The computers 800 can lack some of the components described above, such as graphics adapters 812, and displays 818. For example, the computing system 130 can be formed of multiple blade servers communicating through a network such as in a server farm.

Alternative Embodiments

Although the embodiments disclosed are based on relational databases and illustrated using SQL, the techniques disclosed are applicable to other types of databases, for example, object based databases, object relational databases, and so on. The techniques disclosed are applicable if the database query language used for the particular type of database supports features equivalent to result columns, aggregation clauses, or condition clause. For example, if a database query language supports condition clause, the condition clause predictor can be used to predict the condition clause for an output database query based on an input natural language query.

It is to be understood that the Figures and descriptions of the present invention have been simplified to illustrate elements that are relevant for a clear understanding of the present invention, while eliminating, for the purpose of clarity, many other elements found in a typical distributed system. Those of ordinary skill in the art may recognize that other elements and/or steps are desirable and/or required in implementing the embodiments. However, because such elements and steps are well known in the art, and because they do not facilitate a better understanding of the embodiments, a discussion of such elements and steps is not provided herein. The disclosure herein is directed to all such variations and modifications to such elements and methods known to those skilled in the art.

Some portions of above description describe the embodiments in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. It should be understood that these terms are not intended as synonyms for each other. For example, some embodiments may be described using the term "connected" to indicate that two or more elements are in direct physical or electrical contact with each other. In another example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the invention. This description should be read to include one or at least one and the singular also includes the plural unless it is obvious that it is meant otherwise.

Upon reading this disclosure, those of skill in the art will appreciate still additional alternative structural and functional designs for a system and a process for displaying charts using a distortion region through the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

We claim:

1. A method carried out by a computer system comprising one or more computers, wherein the computer system performs the following steps:
   receiving an input natural language query based on data stored using a database schema;
   generating a sequence of tokens from a plurality of terms comprising:
   terms of the input natural language query,
   a set of columns of the database schema, and
   vocabulary of a database query language;
   generating one or more input representations, each input representation obtained by encoding the sequence of tokens;
   accessing a plurality of machine learning based models, each machine learning based model configured to predict a portion of a database query corresponding to the input natural language query;
   for each of the plurality of machine learning based models, executing the machine learning based model using an input representation to generate a portion of the database query;
   combining the generated portions of the database query to obtain the database query; and
   executing the database query to obtain a result set.

2. The method of claim 1, wherein the input natural language query is received from a client device and the method further comprises a step of sending the result set to the client device.

3. The method of claim 1, wherein the plurality of machine learning based models comprise an aggregation classifier model for determining an aggregation operator in the database query, wherein the aggregation classifier model comprises a multi-layer perceptron.

4. The method of claim 1, wherein the plurality of machine learning based models comprise a result column predictor model for determining the result columns of the database query, wherein the result column predictor model comprises a multi-layer perceptron.

5. The method of claim 1, wherein the plurality of machine learning based models comprise a condition clause predictor model for determining the condition clause of the database query, wherein the condition clause predictor model is based on reinforcement learning.

6. The method of claim 5, further comprising:
receiving a result set based on a ground truth database query;
determining reward values based on a comparison of the result obtained from the generated query and the result obtained from the ground truth query; and
adjusting weights of the condition clause predictor model based on the reward values.

7. The method of claim 5, further comprising:
determining column encodings corresponding to each token of the sequence;
determining a vector comprising scalar attention scores for each token of the input sequence;
normalizing the vector using a softmax function; and
determining the input representation as the sum of the column encodings weighted by the corresponding normalized score.

8. The method of claim 1, further comprising:
training the plurality of machine learning based models using gradient descent to minimize an objective function representing a loss based on the result of each of the plurality of models.

9. The method of claim 1, wherein generating the one or more input representations comprises computing an input representation $\kappa^{agg}$ by:
computing a scalar attention score, $\alpha^{in}_t = W^{inp} h^{enc}_t$ for each tth token in sequence of tokens, wherein $h^{enc}_t$ is a state of an encoder corresponding to a tth word in the input sequence,
normalizing the vector of scores $\alpha^{in} = [\alpha_1^{inp}, \alpha_2^{inp}, \ldots]$ to produce a distribution over the tokens in the sequence of tokens,
obtaining the input representation $\kappa^{agg}$ as $$\kappa^{agg} = \sum_t \beta_t^{inp} h_t^{enc}$$

wherein $\beta^{agg} = \text{softmax}(\alpha^{agg})$, and
$\alpha^{agg} = W^{agg} \tan h(V^{agg} \kappa^{agg} + b^{agg}) + c^{agg}$ 10. The method of claim 1, further comprising:
using a long-short term memory (LSTM) with a pointer network that formulates a select clause of the SQL query with one or more column names, comprising:
given a list of column representations and a question representation, selecting the column that best matches the question, wherein the list of column representations is obtained by encoding each column name with a LSTM, wherein the representation of a particular column j, $e_j^c$ is given by
$h_{j,t}^c = \text{LSTM}(\text{emb}(x_{j,t}^c), h_{j,t-1}^c) e_j^c = h_{j,T}^c$ 11. The method of claim 1, further comprising:
using reinforcement learning to formulate where conditions of the SQL query by executing the generated SQL query against the database to obtain a reward $R(q(\tilde{y}), q_g)$ defined as:

$$R(q(y), q_g) = \begin{cases} -2, & \text{if } q(y) \text{ is not a valid } SQL \text{ query} \\ -1, & \text{if } q(y) \text{ is a valid } SQL \text{ query and executes to an incorrect result} \\ +1, & \text{if } q(y) \text{ is a valid } SQL \text{ query and executes to the correct result} \end{cases}$$

where q(y) denotes the query generated by the machine learning based model, and $q_g$ denotes the ground truth query corresponding to the input natural language query.

12. A method comprising:
processing a natural language request to generate parts of an SQL query, including:
using a long-short term memory (LSTM) with a pointer network that formulates a select clause of the SQL query with one or more column names; and
using an augmented pointer decoder trained by reinforcement learning to formulate where conditions of the SQL query.

13. The method of claim 12, further comprising:
using a multilayer perceptron to determine an aggregation operation of the SQL query applicable to columns selected under specified conditions.

14. The method of claim 12, wherein using a long-short term memory (LSTM) with a pointer network that formulates a select clause of the SQL query with one or more column names comprises:
given a list of column representations and a question representation, selecting the column that best matches the question.

15. The method of claim 14, wherein the list of column representations is obtained by encoding each column name with a LSTM, wherein the representation of a particular column j, $e_j^c$ is given by
$h_{j,t}^c = \text{LSTM}(\text{emb}(x_{j,t}^c), h_{j,t-1}^c) e_j^c = h_{j,T}^c$ 16. The method of claim 14, wherein generating the one or more input representations comprises computing an input representation $\kappa^{agg}$ by:
computing a scalar attention score, $\alpha^{in}_t = W^{inp} h^{enc}_t$, for each tth token in sequence of tokens, wherein $h^{enc}_t$ is a state of an encoder corresponding to a tth word in the input sequence,
normalizing the vector of scores $\alpha^{in} = [\alpha_1^{inp}, \alpha_2^{inp}, \ldots]$ to produce a distribution over
the tokens in the sequence of tokens, obtaining the input representation $\kappa^{agg}$ as $$\kappa^{agg} = \sum_t \beta_t^{inp} h_t^{enc}$$

wherein $\beta^{agg} = \text{softmax}(\alpha^{agg})$, and
$\alpha^{agg} = W^{agg} \tan h(V^{agg} \kappa^{agg} + b^{agg}) + c^{agg}$ 17. The method of claim 14, further comprising:
using reinforcement learning to formulate where conditions of the SQL query by executing the generated SQL query against the database to obtain a reward $R(g(\tilde{y}), q_g)$ defined as:

$$R(q(y), q_g) = \begin{cases} -2, & \text{if } q(y) \text{ is not a valid } SQL \text{ query} \\ -1, & \text{if } q(y) \text{ is a valid } SQL \text{ query and executes to an incorrect result} \\ +1, & \text{if } q(y) \text{ is a valid } SQL \text{ query and executes to the correct result} \end{cases}$$

where q(y) denotes the query generated by the machine learning based model, and $q_g$ denotes the ground truth query corresponding to the input natural language query.

18. A non-transitory computer-readable storage medium comprising computer executable code that when executed by one or more computers causes the one or more computers to perform the steps comprising:
- receiving an input natural language query based on data stored using a database schema;
- generating a sequence of tokens from a plurality of terms comprising:
- terms of the input natural language query,
- a set of columns of the database schema, and
- vocabulary of a database query language;
- generating one or more input representations, each input representation obtained by encoding the sequence of tokens;
- accessing a plurality of machine learning based models, each machine learning based model configured to predict a portion of a database query corresponding to the input natural language query;
- for each of the plurality of machine learning based models, executing the machine learning based model using an input representation to generate a portion of the database query;
- combining the generated portions of the database query to obtain the database query; and
- executing the database query to obtain a result set.

19. A computer system for generating a recurrent neural network (RNN) architecture, the computer system comprising:
- one or more computer processors; and
- a non-transitory computer-readable storage medium comprising computer executable code that when executed by one or more computers causes the one or more computers to perform the steps comprising:
- receiving an input natural language query based on data stored using a database schema;
- generating a sequence of tokens from a plurality of terms comprising:
- terms of the input natural language query,
- a set of columns of the database schema, and
- vocabulary of a database query language;
- generating one or more input representations, each input representation obtained by encoding the sequence of tokens;
- accessing a plurality of machine learning based models, each machine learning based model configured to predict a portion of a database query corresponding to the input natural language query;
- for each of the plurality of machine learning based models, executing the machine learning based model using an input representation to generate a portion of the database query;
- combining the generated portions of the database query to obtain the database query; and
- executing the database query to obtain a result set.

* * * * *